2,938,014
RESIN COMPOSITIONS

Abraham Bavley, Brooklyn, Charles J. Knuth, Flushing, and Francis W. Michelotti, Brooklyn, N.Y., assignors to Chas. Pfizer & Co., Inc., New York, N.Y., a corporation of Delaware No Drawing. Filed Oct. 4, 1957, Ser. No. 688,105

4 Claims. (Cl. 260—47)

This application is concerned with epoxy resin compositions of unique and useful properties. More particularly, it is concerned with epoxy resin compositions which possess the valuable and desirable properties of being almost colorless, homogeneous, hard and rapidly cured resins of excellent flexural strength and favorable distortion temperature values.

Epoxy resins are used commercially in many varied industrial applications. For example, they are used in various adhesive formulations, protective coatings, laminates and foams. One of the most important industrial uses is in the casting and potting of electronic circuits, insulators and other molded products. Epoxy resins are treated with a curing agent such as a polyamine and anhydrides of polycarboxylic acids at elevated temperatures to accelerate the curing process. The curing agents convert the epoxy resins to a substantially infusible and insoluble product, imparting improved heat resistance and electrical properties. In U.S. Patent 2,324,483, Castan describes the conversion of epoxy resins to a substantially thermosetting cast by employing a polycarboxylic acid anhydride, such as phthalic anhydride, adipic anhydride and succinic anhydride, as a curing agent. Epoxy resins generally consist of a polyether derivative of a polyhydric organic compound such as polyhydric alcohols and phenols containing at least two phenolic hydroxy groups, and are further characterized by the presence of at least two terminal 1,2-epoxy groups per molecule of epoxy resin. Epoxy resins are readily available commercial products.

The function of the acid anhydride in curing epoxy resins is commonly thought to be one of crosslinking the epoxy resin through esterification of the epoxy groups. In curing epoxy resins with polycarboxylic acid anhydrides, the process employed usually involves heating a mixture of the epoxy resin and the acid anhydride at elevated temperatures for substantially long period of time. From the economic standpoint, it is undesirable to employ high temperatures for long periods of time. In addition, such conditions lead to undesirable discoloration of the product. The above mentioned epoxy resins are prepared from phenols, for example, bis-(4-hydroxyphenyl)-2,2-propane, and epichlorohydrin, or polyhydric alcohols, for example, glycerine, and epichlorohydrin, the resultant product being a glycidyl polyether containing terminal 1,2-epoxy groups. Although Castan (op. cit.) discloses succinic anhydride as a suitable curing agent for epoxy resins, it is found that epoxy resins cured with succinic anhydride are at best, only slightly cured even at elevated temperatures, such as 170° C.

It has now been unexpectedly discovered that, in contrast with succinic anhydride, methylsuccinic anhydride cures epoxy resins at relatively lower temperatures for shorter periods of time than heretofore commonly employed. Further advantages of methylsuccinic anhydride are obvious in the resin products obtained by curing epoxy resins with this anhydride, for example, castings. Castings obtained by employing methylsuccinic anhydride as curing agent are hard, homogeneous, perfectly transparent and almost colorless and are possessed of the desirable and valuable properties of excellent flexural strength and favorable distortion temperatures. On the other hand, castings obtained with succinic anhydride as curing agent are heterogeneous, opaque, wet, tacky products, consisting of several distinct layers. Substantial amounts of the liquid epoxy resins, obviously only slightly, if at all, cured, form a separate layer in these products.

The process of curing epoxy resins with methylsuccinic anhydride may be carried out under varied conditions of temperature and time. The time of heating varies with the temperature used. For example, excellent cure is effected by heating the epoxy resin-methylsuccinic acid anhydride mixture at a temperature of 170° C. for one hour. Alternatively, substantially the same cure may be accomplished at 100° C. when the heating is continued for a period of two hours. Generally, it is found that heating at temperatures of from about 80° C. to about 170° C. for a time period of from about one to about five hours produces a casting possessed of the above mentioned desirable and valuable properties. Heating at temperatures above 170° C. usually results in undesirable discoloration and other deficiencies of the product particularly where time periods of more than one hour are employed and is not preferred for this reason. A curing temperature of below 80° C. requires long periods of cure which offer no appreciable advantage over the preferred temperature range of this invention.

In the curing of epoxy resins with acid anhydrides, it is desirable to add a catalyst to the reaction mixture but not always necessary. The catalyst facilitates cure as is well known to those skilled in the art. Usually, from about 0.1% to about 1% by weight of a tertiary amine, based on the weight of the epoxy resin-acid anhydride mixture, is employed. The most suitable catalysts are tertiary amines, such as, N,N-dimethylbenzylamine, triethylamine, dimethylaniline, N-ethylmorpholine, N-methylmorpholine, N,N-diethylbenzylamine, and others.

The relative amount of curing agent to be employed with the epoxy resins generally lies in the ratio of from about 0.8 to about 1.2 equivalents of anhydride for each equivalent of epoxy group in the resin. Incorporation of amounts of the polycarboxylic anhydride outside this range usually results in a diminishing of the desired properties of the product. The use of the above mentioned range of anhydride generally results in desirable heat-distortion values, excellent flexural strength, optimum hardness and other desired properties which make the epoxy resin compositions of this invention amenable to general industrial use.

Methylsuccinic anhydride is readily prepared by standard procedures, such as, the dehydration of methylsuccinic acid with acid anhydride, for example, acetic anhydride, at elevated temperatures. Excellent yields of the anhydride of this invention are obtained employing this process. Methylsuccinic acid is readily obtainable by standard procedures, such as the procedure described in U.S. Patent 2,773,897. Epoxy resins defined above as complex polyethers of polyhydric alcohols and phenols containing terminal, 1,2-epoxy groups may be prepared by standard procedures which appear in the literature, for example, Castan (op. cit.), U.S. Patent 2,444,333, U.S. Patent 2,548,447, and U.S. Patent 2,643,239. Generally, the epoxy resins are obtained as the reaction product of epihalohydrin, such as, epichlorohydrin, and a polyhydric alcohol or phenol, for example, resorcinol, ethylene glycol, diethylene glycol, 1,5 dihydroxynaphthalene, 1,3,5 trihydroxybenzene, glycerol and bis-(p-hydroxyphenyl)-2,2-propane. Many such epoxy resins are commercially available under the name of Epon resins from Shell Chemical Corporation or Araldite resins from the Ciba Company.

The physical properties such as viscosity and melting point, hydroxyl number and so forth of Epon resins are described in the literature, for example, in "Polymer Processes," by C. Schildknecht, Interscience Publishers Inc., New York, N.Y., 1956, page 433. General discussion of the preparation of epoxy resins from phenols and polyhydric alcohols is found in the same text, pages 434–435. Epon resins employed in the following examples are described in the above mentioned text in terms of their properties which is to be considered a part of this disclosure by reference.

The following examples are given by way of illustration and are not to be construed as limitations of this invention many variations of which are possible within the scope and spirit thereof.

Example I

A mixture of 3.3 grams of succinic anhydride with 5.0 grams of Epon 562 was prepared. A second mixture of 3.7 grams of methylsuccinic anhydride with 5.0 grams of Epon 562 was prepared. To each mixture was added about 30 milligrams of N,N-dimethylbenzylamine. The mixtures were thoroughly stirred to blend the ingredients and then heated in an oven at 100° C. for 2 hours. After cooling, the product obtained with methylsuccinic anhydride was a very pale straw colored, clear, hard resin. The product obtained from succinic anhydride was a sticky, wet, heterogeneous mixture consisting of 3 separate layers.

Epon 562 (Shell Chemical Corp.) is an aliphatic epoxy resin which contains approximately 0.64 mole of the epoxy group per 100 grams.

Example II

A mixture of 2.9 grams of methylsuccinic anhydride with 4.7 grams of Epon 828 was prepared. A second mixture of 2.6 grams of succinic anhydride with 4.7 grams Epon 828 was prepared. No amine catalyst was added. The mixtures were thoroughly stirred to blend the ingredients and heated in an oven at 100° C. for 2 hours. The product obtained from methylsuccinic anhydride was a very pale straw colored, hard resin, while that obtained with succinic anhydride was a sticky, wet, heterogeneous mixture consisting of 3 separate layers, one of which was apparently uncured epoxy resin.

Epon 828 (Shell Chemical Corp.) is a phenolic epoxy resin which contains approximately 0.54 mole of the epoxy group per 100 grams.

Example III

Sample mixtures of 2.3 grams of methylsuccinic anhydride with 3.9 grams of Epon 562, and 2.0 grams of succinic anhydride with 3.9 grams of Epon 562 were prepared. To some sample mixtures of each was added 30 milligrams of N,N-dimethylbenzylamine. To the remaining samples, no amine catalyst was added. The mixtures, after thorough blending, were heated in an oven at 170° C. for 1 hour. The castings produced with methylsuccinic anhydride with and without the amine present, gelled in at least 15 minutes. After 1 hour of heating at this temperature, they were cooled. A homogeneous, hard, transparent light straw colored casting was obtained. The castings obtained with succinic anhydride with and without an amine catalyst present were cooled after 1 hour of heating. Heterogeneous, tacky, castings consisting of several separate layers were obtained.

Example IV

The process of Example III was repeated employing 4.5 grams of Epon 828 in place of Epon 562 with identical results.

Example V

The process of Example III was repeated with heating at 170° C. being continued for 2 hours instead of 1 hour. Identical results were obtained.

Example VI

Sample mixtures of 3.3 grams of succinic anhydride with 6.2 grams of Epon 562 and 3.7 grams of methylsuccinic anhydride with 6.2 grams of Epon 562, to each of which was added 30 milligrams of N,N-dimethylbenzylamine, were heated at from 120° to 130° C. for 1½ hours. The castings obtained with methylsuccinic anhydride were hard, homogeneous, perfectly transparent, light straw colored products. The castings obtained from succinic anhydride were heterogeneous, opaque, tacky, wet products consisting of several separate layers.

Example VII

Sample mixtures of 2.6 grams of succinic anhydride with 4.0 grams of Epon 828 and 2.9 grams of methylsuccinic anhydride with 4.0 grams of Epon 828, to each of which was added 30 milligrams of N,N-dimethylbenzylamine, were heated at from 120° to 130° C. for 1 hour. The castings obtained with methylsuccinic anhydride were hard, homogeneous, perfectly transparent products of pale straw color. The casting obtained with succinic anhydride was a heterogeneous, opaque, wet product consisting of several separate layers.

Example VIII

The process of Example II was repeated at 80° C. for 5 hours with identical results.

Example IX

A mixture of 51.4 grams of methylsuccinic acid and 100 milliliters of acetic anhydride was refluxed under dry atmosphere for one hour. The excess acetic anhydride was then removed under reduced pressure by heating. Methylsuccinic anhydride was then distilled at a pressure of one millimeter of mercury to obtain 34.6 grams of product which is a solid melting at 36° C.

Example X

A mixture of 5 grams of an epoxy resin containing 0.66 mole of epoxy group per 100 grams prepared from glycerol and epichlorohydrin employing the procedure disclosed in U.S. Patent 2,548,447, 3.7 grams of methylsuccinic anhydride and 30 mg. of N,N-dimethylbenzylamine was thoroughly agitated to disperse the ingredients. The mixture was heated at 130° C. for one and a half hours. After cooling, the casting was hard, pale straw in color, homogeneous and perfectly transparent.

Example XI

A mixture of 3.7 grams of methylsuccinic anhydride and 6.4 grams of an epoxy resin containing 0.5 mole of epoxy group per 100 grams prepared from bis-(4-hydroxyphenyl)-2,2-propane and epichlorohydrin employing the procedure disclosed in U.S. Patent 2,643,239, and 30 mg. of N,N-dimethylbenzylamine was thoroughly agitated to disperse the ingredients. The mixture was heated at 130° C. for one and a half hours. After cooling, the casting was hard, pale straw in color, homogeneous and perfectly transparent.

The castings of epoxy resin compositions containing methylsuccinic anhydride described in the examples are found to be of excellent flexural strength and favorable heat-distortion values to be of valuable use in various industrial applications.

What is claimed is:

1. The thermosetting resin composition which comprises the heat reaction product of (1) a glycidyl polyether of a polyhydric compound, said polyhydric compound being selected from the group consisting of polyhydric alcohols and polyhydric phenols and (2) from about 0.8 to about 1.2 equivalents of methylsuccinic anhydride per equivalent of epoxy group in said epoxy resin.

2. The thermosetting resin composition which comprises the heat reaction product of (1) an epoxy resin prepared by reacting bis(4-hydroxyphenyl)-2,2-propane and epichlorohydrin, and (2) from about 0.8 to about 1.2 equivalents of methylsuccinic anhydride per equivalent of epoxy group in the epoxy resin.

3. The thermosetting resin composition which comprises the heat reaction product of (1) an epoxy resin prepared by reacting glycerol and epichlorohydrin and (2) from about 0.8 to about 1.2 equivalents of methylsuccinic anhydride per equivalent of epoxy group in the epoxy resin.

4. A process for the preparation of a thermosetting resin composition which comprises heating (1) a glycidyl polyether of a polyhydric compound, said polyhydric compound being selected from the group consisting of polyhydric alcohols and polyhydric phenols and (2) from about 0.8 to about 1.2 equivalents of methylsuccinic anhydride per equivalent of epoxy group in the epoxy resin, at a temperature of from about 80° C. to about 170° C. for from about one to about five hours.

References Cited in the file of this patent

UNITED STATES PATENTS

| | | |
|---|---|---|
| 2,768,153 | Shokal | Oct. 23, 1956 |
| 2,773,897 | Bavley et al. | Dec. 11, 1956 |